March 19, 1963   Z. J. THELEN   3,081,615
PELT FLESHING MACHINES
Filed Aug. 1, 1961
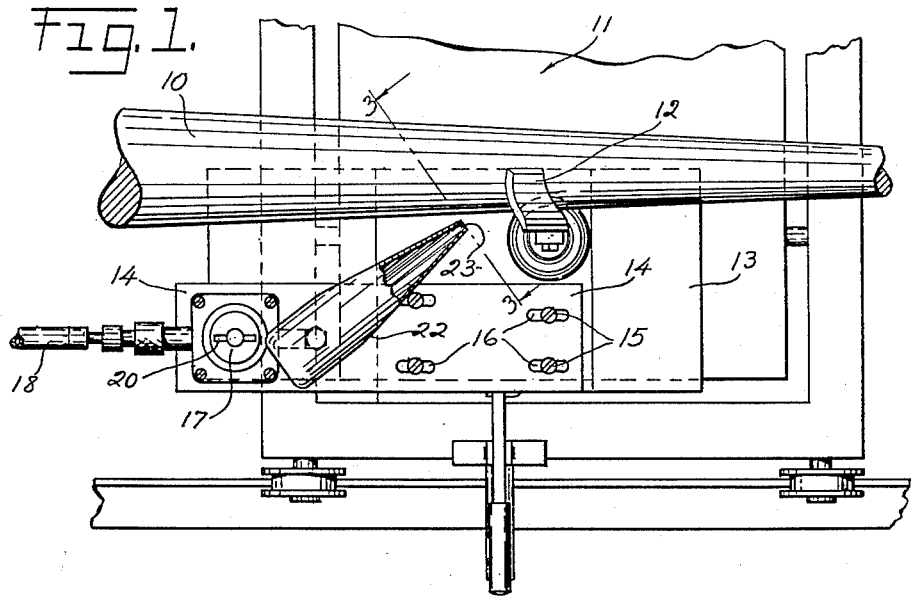
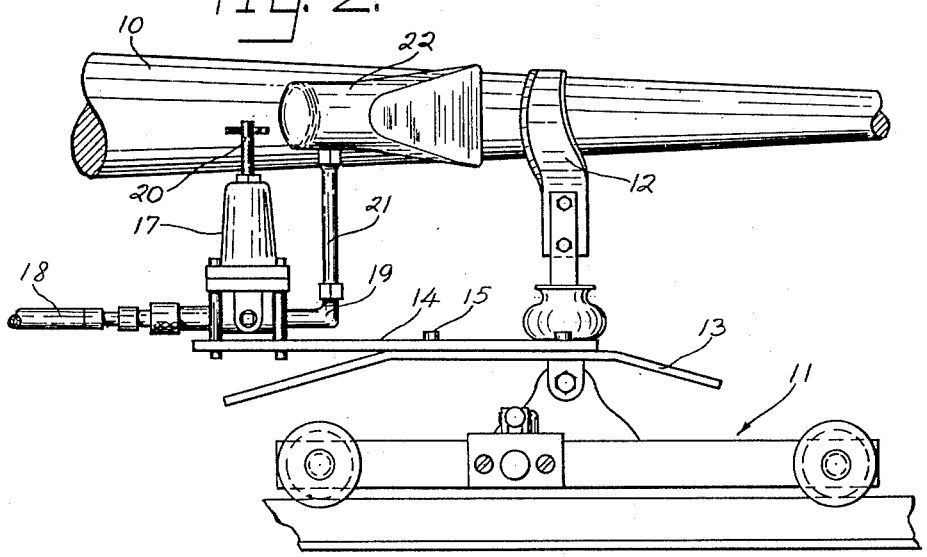
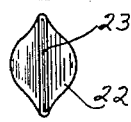
INVENTOR.
ZENO J. THELEN
BY *Morsell & Morsell*
ATTORNEYS.

United States Patent Office 3,081,615
Patented Mar. 19, 1963

3,081,615
PELT FLESHING MACHINES
Zeno J. Thelen, 219 Oak St., Chilton, Wis.
Filed Aug. 1, 1961, Ser. No. 128,491
4 Claims. (Cl. 69—46)

This invention relates to improvements in pelt fleshing machines, and more particularly to an attachment for power fleshing machines which is designed to remove the skin oils and greases from an animal pelt as the machine fleshes said pelt.

In the use of power fleshing machines such as those disclosed in Patent Nos. 2,942,448 and 2,941,391, a mink pelt, or the pelt of some other fur-bearing animal, is turned inside out and mounted on a rotatable, horizontally-disposed pole. A power driven, reciprocating knife is then pressurably positioned against and moved lengthwise of said pelt to cut the flesh and fat tissue therefrom. Such power-actuated fleshing devices have greatly facilitated and speeded the tedious job of fleshing pelts, which was previously done entirely by hand, but, unfortunately, even with such machines it is still necessary to carefully wipe the skin oils and greases from each pelt after it has been fleshed, which is a time-consuming task. Moreover, after the pelts have been hung up to dry for a period of time it is frequently necessary to again wipe the same in order to remove oils which were not removed with the first wiping.

With the above in mind, the principal object of the present invention is to provide a novel attachment for a power fleshing machine which is adapted to automatically and thoroughly remove the skin oils and grease from a pelt simultaneously with the fleshing operation, thereby eliminating the tedious chore of manually wiping each pelt, and greatly speeding and facilitating the fleshing operation.

A more specific object of the present invention is to provide an attachment for power fleshing machines which is adapted to direct a high-velocity jet of compressed air against the pelt being fleshed, immediately in front of the fleshing knife, which air stream functions to loosen and remove the skin oils and greases from said pelt.

Further objects of the present invention are to provide a novel attachment for power fleshing machines which is designed to remove the skin oils from a pelt as described, which attachment is simple and relatively inexpensive in design and construction, which is durable, and which is otherwise unusually well adapted for its intended purposes.

With the above and other objects in view, the invention consists of the novel skin oil-removing attachment for pelt fleshing machines, and all of its parts and combinations as set forth in the following specification and claims, and all equivalents thereof.

In the accompanying drawings, illustrating the preferred form of the invention, and wherein the same reference numerals designate the same parts in all of the views:

FIG. 1 is a top plan view of the oil and grease-removing attachment comprising the present invention mounted on the carriage of a power fleshing machine, parts of said attachment being broken away and shown in section;

FIG. 2 is a fragmentary side elevational view of a power fleshing machine with the oil-removing attachment mounted thereon; and FIG. 3 is a front elevational view of the nozzle employed in the invention, taken along line 3—3 of FIG. 1.

Referring now more particularly to FIGS. 1 and 2 of the drawing, illustrated therein is a portion of a power fleshing machine similar to those disclosed in Patent Nos. 2,942,448 and 2,941,391, the numeral 10 designating the pelt-holding pole, the numeral 11 the movable knife-supporting carriage, and the numeral 12 designating the reciprocating fleshing knife utilized in such machines. In the use of a power fleshing machine of this type, the pelt (not shown) of a mink or other fur-bearing animal is turned inside out and mounted on the pole 10. An electric motor is then actuated to drive the reciprocating knife and the operator positions the knife against the pelt and begins moving the carriage and knife longitudinally along the pelt, said knife cutting or scraping the flesh and fat tissue from the pelt as it moves therealong. During the fleshing operation the operator turns the rotatable pole 10, of course, so that the entire pelt is fleshed.

As is shown in said FIGS. 1 and 2, the novel device comprising the present invention, and which is designed to eliminate the tedious job of manually wiping the pelts after they have been fleshed, consists of a base 14 which is secured by bolts 15 to the carriage platform 13, the bolt holes 16 in said base being slotted in design to permit a certain amount of longitudinal adjustment of said base relative to the knife.

A valve unit 17 is permanently mounted on said base 14 and is connected by a flexible air line 18 to a compressed air cylinder (not shown) or other suitable source of compressed air or gas, and which may be positioned at any convenient location relative to the machine. Said valve unit includes a rigid, L-shaped discharge conduit 19 adjacent its lower end, and a handle and valve stem 20 whereby the volume and velocity of the compressed air emitted through said discharge member can be controlled by the operator. The design and function of said valve is not new, of course, and is not claimed as novel per se in the present invention. Moreover, various other types of valves might perform satisfactorily and the invention is not to be limited to use with a valve unit exactly as shown.

Coupled to the valve discharge conduit 19 is a rigid vertical tube 21, and rotatably adjustably mounted on the upper end of said vertical tube is an elongated, generally cylindrical nozzle 22. As illustrated in the drawings, said nozzle is tapered rearwardly in a horizontal plane and flared outwardly in a vertical plane, there being a vertical opening 23 in the rearward end of said nozzle through which compressed air delivered to said nozzle is discharged. The particular design of said nozzle unit is an important feature of the invention, as will be hereinafter seen.

In the use of the novel device comprising the present invention, the base 14 is first bolted or otherwise secured to the movable carriage 13, as described, and the unit is adjusted so that the nozzle 22 is properly spaced from, and at the desired angle relative to, the pelt-holding pole 10. After a pelt has been mounted on said pole and the fleshing operation is ready to commence, the operator merely opens the valve 17 and compressed air is directed by said nozzle against the pelt immediately in front of the fleshing knife 12.

Due to the novel design of the nozzle 22, wherein the discharge end is tapered, to give maximum velocity and force to the air stream but wherein said nozzle is flared to provide fan-like area coverage, the air stream emitted therefrom forms a high-speed jet which covers the entire pelt area immediately in front of the knife. As said knife reciprocates, to sever the flesh and fat tissues from the pelt, the air jet emitted by said nozzle tends to "blow" the skin oils and greases in the pelt rearwardly and onto the knife. Due to the beveled nature of the leading edge of said knife, and the angular arrangement of the same relative to the pelt-holding pole, as is fully described in the aforementioned Patents Nos 2,942,448 and 2,941,391, said skin oils are directed onto the knife outer surface by the force of the air stream, where gravity and the reciprocating motion of said knife causes said oils and greases collected thereon to flow downwardly until they fall harmlessly from the knife lower end. If desired, a collecting pan or container can be mounted on the machine carriage immediately beneath the knife to catch the oils and greases falling therefrom and to facilitate their disposal.

The result is that all of the undesirable skin oils and greases are automatically and thoroughly removed from the pelt simultaneously with the fleshing operation, and there is no need for the operator to tediously manually wipe each pelt after he has fleshed the same.

The most effective setting and angular arrangement of the nozzle 22 might vary depending on the amount of air pressure employed, or on other factors, but can be easily determined by trial and error. Moreover, it is not critical to the successful operation of the invention that said nozzle be positioned with a high degree of exactness.

The principal feature of the present invention, and which is believed to be novel, is the concept of utilizing a high-velocity stream of compresed air to remove the skin oils and greases from a pelt simultaneously with the fleshing operation, and it is to be understood that the invention is not to be limited to the exact structural details illustrated and hereinabove described. In this respect, it is contemplated not only that many structural changes or modifications will undoubtedly occur to those skilled in the art, but that some other gas, under pressure, might be advantageously employed instead of compressed air. It is to be understood, in other words, that the present invention is intended to include any such structure or device which may come within the spirit of the invention and within the scope of the following claims.

What I claim is:

1. In a pelt fleshing machine having a pelt-holding pole, having a fleshing element, and having a supporting member longitudinally movably supporting said fleshing element relative to said pelt-holding pole, a skin oil and grease-removing device comprising: a fluid valve mounted on said movable supporting member, said valve having means for controlling the volume of fluid under pressure passing therethrough; a fluid line leading from a source of fluid under pressure and connected to said valve; and a nozzle communicating with said valve and rotatably adjustably mounted on said movable supporting member adjacent and forwardly of said fleshing element, said nozzle having a discharge opening and being positionable to discharge fluid under pressure against, and at an angle relative to, the pelt-holding pole immediately in front of said fleshing element.

2. In a pelt fleshing machine having a pelt-holding pole, having a fleshing element, and having a supporting member longitudinally movably supporting said fleshing element relative to said pelt-holding pole, a skin oil and grease-removing device comprising: a nozzle mounted on said movable supporting member adjacent and forwardly of said fleshing element, said nozzle being mounted in a manner permitting its pivotal adjustment in a horizontal plane, and said nozzle having a discharge opening positionable to discharge fluid under pressure against, and at an angle relative to, the pelt-holding pole immediately in front of said fleshing element; a fluid line leading from a source of fluid under pressure and connected to said nozzle; and valve means associated with said line for controlling the passage of fluid under pressure through said nozzle.

3. In a pelt fleshing machine having a pelt-holding pole, having a carriage adjacent and movable longitudinally of said pole, and having a reciprocating fleshing knife mounted on said carriage, a skin oil and grease-removing device comprising: a gas valve mounted on the fleshing machine carriage adjacent and forwardly of said fleshing knife, said valve having a discharge conduit and having means for controlling the volume of gas under pressure emitted through said discharge conduit; a flexible gas line leading from a source of gas under pressure and connected to said valve; a rigid vertical tube mounted on and communicating with said valve discharge conduit; and a nozzle rotatably adjustably mounted on the upper end of said vertical tube, said nozzle having a discharge opening in its rearward end, and said nozzle being positioned to direct gas under pressure against, and at an angle relative to, the pelt-holding pole immediately in front of said fleshing knife.

4. In a pelt fleshing machine having a pelt-holding pole, having a carriage adjacent and movable longitudinally of said pole, and having a reciprocating fleshing knife mounted on said carriage, a skin oil and grease-removing device comprising: a base adjustably mounted on the fleshing machine carriage adjacent and forwardly of said fleshing knife; a gas valve mounted on said base, said valve having a discharge conduit and having means for controlling the volume of gas under pressure emitted through said discharge conduit; a flexible gas line leading from a source of gas under pressure and connected to said valve; a rigid vertical tube mounted on and communicating with said valve discharge conduit; and a generally cylindrical nozzle rotatably adjustably mounted on the upper end of said vertical tube, said nozzle being flared rearwardly in a vertical plane, and having a vertical discharge opening in its rearward end, said nozzle being positioned to direct a fan-shaped jet of gas under pressure against, and at an angle relative to, the pelt-holding pole immediately in front of said fleshing knife.

References Cited in the file of this patent

UNITED STATES PATENTS

| | | |
|---|---|---|
| 2,666,317 | Griffin | Jan. 19, 1954 |
| 2,669,111 | Griffin | Feb. 16, 1954 |
| 2,669,112 | Griffin | Feb. 16, 1954 |
| 2,896,438 | Larson | July 28, 1956 |
| 2,910,856 | Fredrickson | Nov. 3, 1959 |
| 2,941,391 | Henfling | June 21, 1960 |
| 2,942,448 | Jonas | June 28, 1960 |